Dec. 8, 1931.   P. J. OSBORNE   1,835,174
VEHICLE WINDOW
Filed March 21, 1929
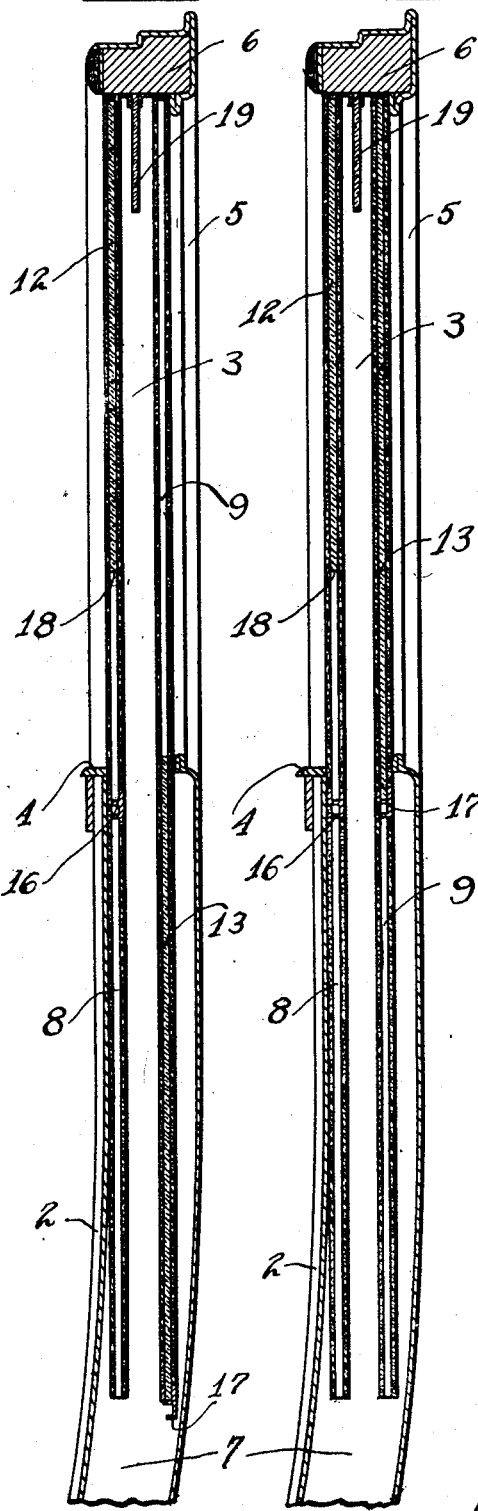
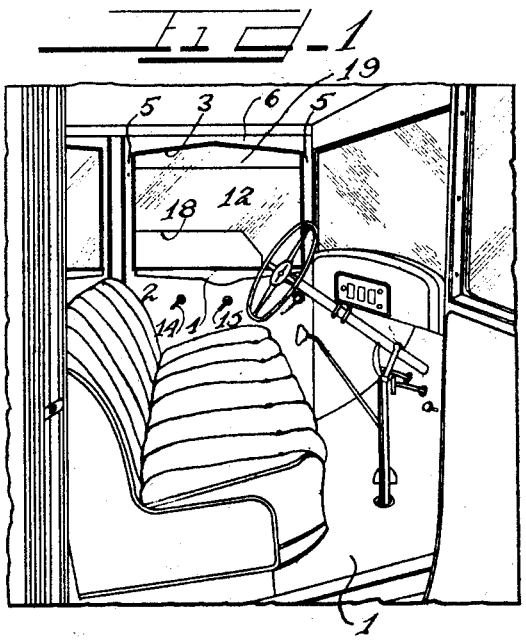
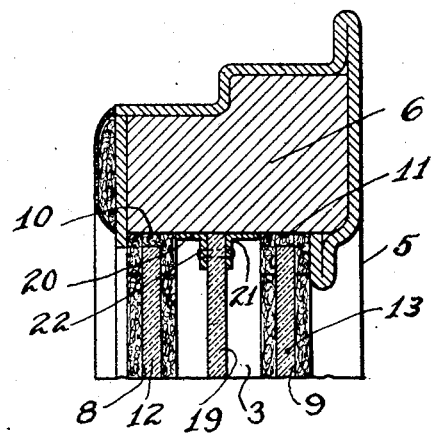
Inventor
Paul J. Osborne
by Charles H. Hills   Attys.

Patented Dec. 8, 1931

1,835,174

UNITED STATES PATENT OFFICE

PAUL J. OSBORNE, OF OZONE PARK, NEW YORK

VEHICLE WINDOW

Application filed March 21, 1929. Serial No. 348,683.

This invention relates to improvements in vehicle windows, and contemplates more particularly a plurality of separately operable windows for a window opening, the invention being highly desirable for vehicles of the character of automobiles, although the invention may have other and various uses as will be apparent to one skilled in the art.

It is well known that the traffic laws of many jurisdictions require the driver or some other occupant of a motor vehicle to extend an arm from the vehicle when about to execute some maneuver such as slowing down, turning a corner, etc. In the past, many and various window structures have been developed in an attempt to facilitate the extension from a vehicle of an arm of a rider. However, these formerly known window structures have in most instances proven objectionable due to structural peculiarities. In many instances, an aperture was provided in a window through which a rider's arm might be protruded, the aperture being normally closed by a spring trap door or flap, which was a fruitful cause of vexatious delay and oftentimes dangerous in that the spring flap tended to prevent a withdrawal of the arm from the window. Slidable panels and various other contrivances have also been employed in these formerly known window constructions, but in practically every case the devices necessitated an undesirable amount of time and attention with the frequent resultant detraction of the driver's attention from the road ahead. In most cases, too, if the devices were adjusted so as to exclude drafts, an arm could not be extended through the window sufficiently rapidly to adequately cope with an emergency; while on the other hand, if an unobstructed opening was left in the window the draft therethrough was often undesirably pronounced.

The present invention has been designed to overcome the above noted as well as other defects and objections in the provision of a window construction for vehicles including a plurality of separately operable windows for a window opening in the vehicle body.

The invention also seeks the provision of a vehicle window having an opening therein for the extension therethrough of a rider's arm, which opening is adjustable in size by properly moving the window.

Another object of the present invention is the provision of a vehicle window having an adjustable opening therethrough, there being a second window adjacent the first mentioned window for utilization when the vehicle body is locked.

Still another object of the present invention is the provision of window construction for vehicles, which construction permits the expeditious extension of a rider's arm through the window, and at the same time eliminates undue and objectionable drafts.

A still further object of the present invention is the provision of a window construction for vehicles which permits a window to be lowered to some extent without causing an undue or objectionable draft.

While some of the more salient features, characteristics, and advantages of a construction or means embodying the present invention have been above pointed out, others will become apparent from the following disclosures.

The invention includes these and other features of construction and combinations of parts hereinafter described, and shown in a preferred form in the drawings, as more particularly indicated by the claims.

On the drawings:

Figure 1 is a fragmentary perspective view of the interior of a vehicle body equipped with window construction embodying features and principles of the present invention.

Figure 2 is an enlarged vertical sectional view taken through the door of the vehicle adjacent the driver's seat, showing the windows in position for driving.

Figure 3 is a view similar to Figure 2 showing both windows in closed position.

Figure 4 is a still further enlarged fragmentary sectional view of the top portion of the structure shown in Figures 2 and 3.

As shown on the drawings:

In the structure selected to illustrate an embodiment of the present invention, there is shown a vehicle body 1 including a door 2 having a window opening 3 therethrough defined by a boundary including a sill 4, side stiles 5, and a top rail 6. As is customary in vehicle doors of the character of the door 2, the sill 4 is provided with a relatively large slot in its upper surface to permit the passage of a window therethrough into a chamber 7 formed in the lower portion of the door.

In the present instance, each of the side stiles 5 is provided with two grooves, either unlined, or else lined with any suitable soft material, such as felt for example, to form a track 8 running substantially vertically, and a similar outer track 9. Secured to the under face of the top rail 6 are two grooved seats 10 and 11 of material similar to the lining of the tracks 8 and 9, the inner seat 10 transversely joining the upper ends of the track 8, and the seat 11 likewise joining the upper ends of the track 9.

Vertically slidable in the inner track 8 is an inner window 12, and vertically slidable in the outer track 9 is an outer window 13. These windows are separately operable by any desired means, and preferably means of the character for association with the handles 14 and 15 which control the inner and outer windows 12 and 13 respectively. Each of the windows 12 and 13 is provided at its lower end with the customary grooved sash bar, these sash bars being designated as 16 and 17 respectively.

In the present case, a portion of the inner window 12 is cut away to form an opening 18 therethrough in the lower part of the window, the sash bar 16 forming the lower boundary of the opening 18. By lowering and raising the window 12, the size of the opening 18 may be adjusted to properly fit the arm of an individual driver, in the event it is desired to exclude as much air from the interior of the vehicle as possible. Of course, when the vehicle is being driven and the opening 18 is being used, the outer window 13 is preferably down or in open position, and when the inner window 12 is lowered to lessen the size of the opening 18, a panel 19 extending transversely between the windows 12 and 13 effectively excludes at least any undue or pronounced draft tending to enter through the top opening left by the lowering of the window 12.

The panel 19 may be made of any desirable material, but is preferably made of a transparent material so as not to interfere in any degree with the driver's vision. Further, the panel may be mounted on the top rail 6 in any desired manner, for example as shown by the transversely extending angle bars 20 and 21 between which the panel is held in position by a rivet or rivets 22.

In operation, the present invention is extremely simple and affords substantially no excuse whatsoever for detracting the driver's attention from the road ahead. Assuming now that the vehicle is being driven in weather sufficiently cool or stormy to render open windows a pronounced discomfort to the occupants of the vehicle; the outer window 13 is preferably lowered or moved into open position by the handle 15. The inner window 12 is next lowered so that the opening 18 therein will be of just sufficient height to properly accommodate the arm of the individual driver on the particular occasion. The depending panel 19 effectively eliminates or prevents objectionable drafts from entering the vehicle through the top of the window opening 3. There will be relatively little draft or cold air entering the opening 18, perhaps just an adequate amount for proper ventilation, but it is to be especially noted that the opening 18 is located in such a position that it may be effectively plugged by the driver's left elbow, it being a common habit for vehicle drivers to rest an elbow upon the window sill.

It should also be noted that when the vehicle is being driven in the nighttime or in a locality where an extended arm is not necessary as a signal, both windows 12 and 13 may be slightly lowered, for the purpose of providing ventilation for the interior of the vehicle, the panel 19 acting as a baffle for the incoming air and thus preventing objectionable draft. If this mode of ventilation for any reason proves unsatisfactory, the inner window 12 may be left closed and the outer window 13 lowered any desirable extent, the air passing over the upper edge of the window 13, downwardly between the windows and entering the vehicle body through the opening 18. Obviously the window construction embodied in the present invention affords the driver and occupants of a vehicle several methods for obtaining adequate ventilation in an expeditious manner.

Circumstances may arise which render it impracticable or undesirable to use both windows 12 and 13, and in such event either window may be dispensed with and substantially the same results obtained, it being understood, of course, that the opening 18 may be in either window. By providing the panel 19 in substantially the same height as the opening 18, the vehicle body may be locked in this region by lowering the window until the upper edge of the window is slightly above the lower edge of the panel, and the opening 18 will be in the chamber 7. When the vehicle is driven the window may be raised to full closed position.

From the foregoing it will be apparent that I have provided a window construction for vehicle bodies which provides simple and adequate means for the extension of an arm by an occupant of the vehicle with perfect freedom of motion, and affording nothing to detract the driver's attention, while at the same time objectionable drafts, or rain, snow, and the like are effectively excluded. It should also be noted that the present invention affords several ways or means for adequately ventilating the interior of the vehicle body without causing the occupants thereof any discomfort due to the elements. Moreover, the construction or apparatus disclosed and described herein may be provided as standard equipment and built in during the construction of the vehicle body, or may be added to the vehicle body after the same has been completely constructed. Further, the construction embodied in the present invention need not of necessity be provided in a vehicle door, but may be provided in association with any desired window opening of the vehicle. In addition, the present invention affords a durable construction, pleasing in appearance, and economical to manufacture and install.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In combination, a vehicle body having a window opening therein, a plurality of windows slidable upwardly and downwardly to open and close said opening to a desired extent, one of said windows having a portion thereof cut away to provide an opening adjustable in size by moving said window relatively to the boundary of said window opening.

2. In combination, a vehicle body having a window opening therein, spaced tracks in the portions defining said opening, a window slidable upwardly and downwardly to a desired extent in each of said tracks, one of said windows having an opening therein in the lower part thereof to permit the extension of the arm of a passenger.

3. In combination, a vehicle body having a window opening therein, an inner and an outer window for said opening, each of said windows being movable upwardly and downwardly to a desired extent, said inner window having an opening in the lower part thereof to permit the extension of an arm of a passenger when said outer window is in open position, and a panel depending from the upper part of the boundary of said window opening adjacent said inner window to exclude drafts when said inner window is partially lowered for diminishing the size of the opening therein.

4. In combination, a vehicle body having a window opening therein, an inner and an outer window for said opening, said windows being movable to open and closed positions and operable individually and simultaneously, the inner window having an arm opening therein adjustable in size by moving said inner window relatively to the boundary of said window opening, and means extending from said boundary parallel to said inner window and adjacent thereto for excluding drafts when said inner window is partially open, said outer window being effective to entirely close said window opening regardless of the position of said inner window.

5. In combination, a vehicle body having a window opening therein, two spaced juxtaposed windows each movable to open and close said opening to any desired extent, and means supported by said body and extending between said windows for acting as a baffle to incoming air when both of said windows are in partially open position.

6. In combination, a vehicle body having a window opening therein, inner and outer windows movable upwardly and downwardly for closing said opening to a desired extent, the outer of said windows being capable of completely closing said opening, and the inner of said windows having an aperture in the lower portion thereof and capable of completely closing said opening with the exception of said aperture, whereby said outer window may be lowered somewhat and incoming air must pass over the top of said outer window, downwardly between said windows, and inwardly through said aperture.

In testimony whereof I have hereunto subscribed my name at Ozone Park, New York city, Queens County, New York.

PAUL J. OSBORNE.